April 14, 1959 G. H. STEPHENSON 2,882,483
VARIABLE LINKAGE TRANSFORMERS
Filed Dec. 14, 1954
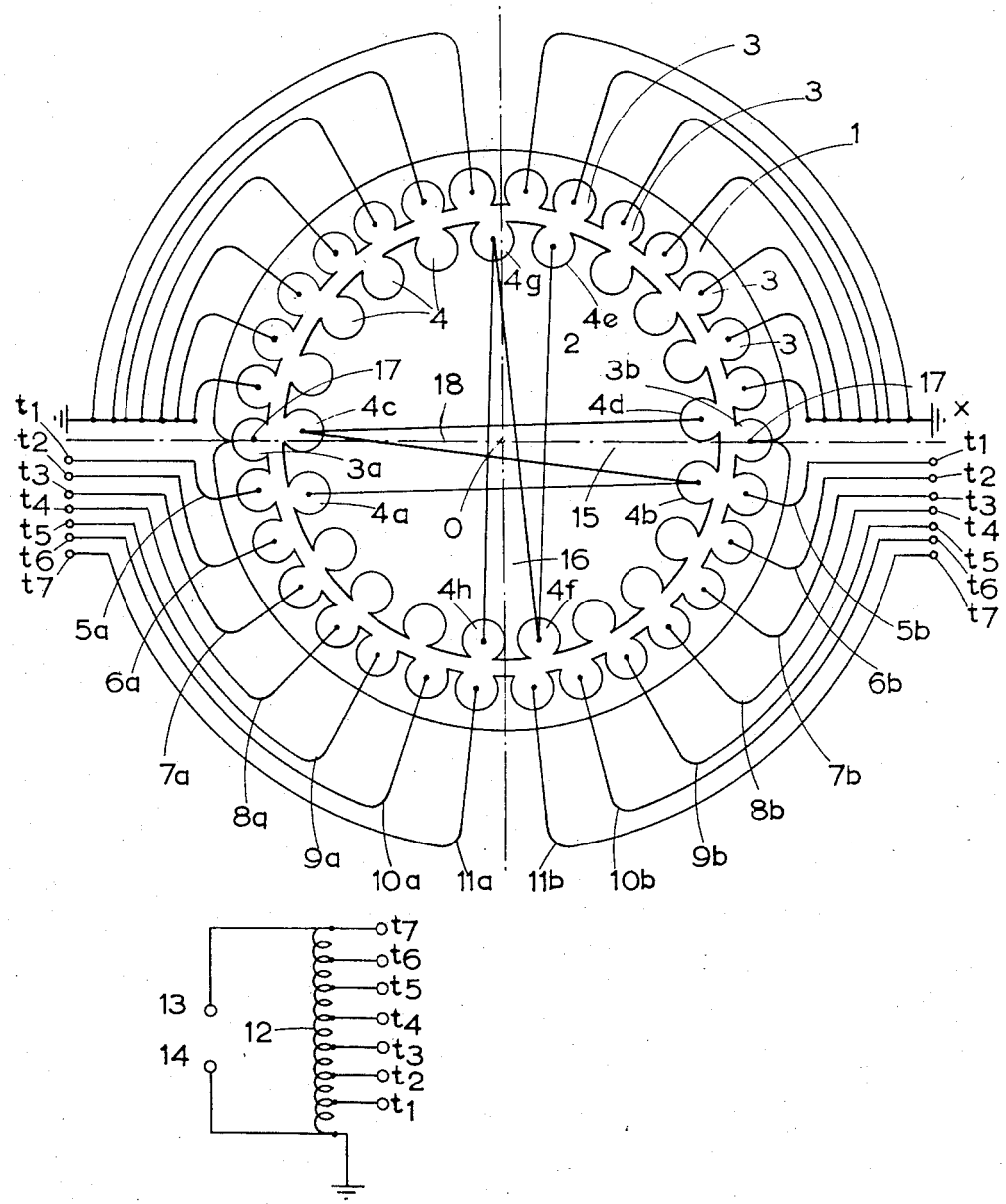
Inventor
G. H. Stephenson United States Patent Office 2,882,483
Patented Apr. 14, 1959

2,882,483
VARIABLE LINKAGE TRANSFORMERS

Geoffrey Huson Stephenson, Ealing, London, England, assignor to Electric & Musical Industries Limited, Hayes, Middlesex, England, a company of Great Britain Application December 14, 1954, Serial No. 475,088

Claims priority, application Great Britain December 15, 1953

8 Claims. (Cl. 323—47)

This invention relates to variable linkage transformers especially for use in automatic control systems.

In automatic control systems, it is often necessary to derive a voltage which is the analogue of the angular displacement of a shaft. In one such arrangement it is proposed to employ a variable linkage transformer to yield a voltage analogue of a shaft position. The transformer may be required to have two secondary windings rotatable with the shaft and having their magnetic axes at right angles to each other. It is required that the output voltage from each secondary winding shall be zero at two angular positions of the respective secondary windings and shall be linearly proportional to the angular displacement of the secondary winding through a range of about ±60° from the null position. It may also be required that the transformer have a low output impedance. The object of the present invention is to provide a variable linkage transformer of simple construction with a view to satisfying the aforesaid requirements.

According to the present invention there is provided a variable linkage transformer comprising a series of primary windings and at least one secondary winding, said primary windings being wound on a virtually cylindrical magnetisable core so that the primary windings have a common axis perpendicular to the axis of said core and enclose a series of different areas on the effective surface of said core, the axis of said secondary windings being perpendicular to the axis of the core and said core and said secondary winding being mounted for relative angular displacements about the latter axis, the arrangement being such that when said primary windings are suitably energised a voltage can be derived from the secondary winding which is substantially linearly related to the relative angular displacement of said core and said secondary windings over a relatively wide range of displacements.

In order that the invention may be clearly understood and readily carried into effect, the invention will be described with reference to the accompanying drawings, the single figure of which illustrated one example of a variable linkage transformer in accordance with the present invention.

Referring to the drawing, the variable linkage transformer comprises a stator core 1 and a rotor core 2 similar to those of a resolver Magslip. Only the inner or effective surface of the stator core is represented in the drawing. The stator and the rotor cores are both virtually cylindrical and coaxial and the rotor is mounted for angular displacement about the axis of the cores, which is normal to the plane of the drawing and denoted in the drawing by the reference 0. The stator 1 has 30 slots, a few of which are denoted by the references 3, the slots extending in the direction parallel to the axis 0. The rotor has 21 slots similar to the stator slots, a few being denoted by the references 4. Two diametrically opposite slots on the stator 3a and 3b carry a short-circuit winding 17 which has 120 turns of 30 S.W.G. copper wire, which need not be insulated. The remaining stator slots are filled by 14 primary exciting windings. Seven of these windings are denoted by references 5a to 11a and are symmetrical about the slot 3a. The other 7 windings are denoted by the references 5b to 11b and are symmetrical about the slot 3b. All primary windings have 90 turns of 30 S.W.G. insulated copper wire. For simplicity of illustration only a single turn of each winding is represented in the drawing. All the primary windings have one end grounded, and the other ends of the windings 5a to 11a are connected respectively to terminals $t1$ to $t7$. The other ends of the windings 5b to 11b are similarly connected to the same terminals. It will be observed that the primary windings have a common axis, denoted by the reference 18, which is perpendicular to the axis 0. Moreover the primary windings are arranged in pairs, the windings of each pair, for example 11a and 11b, being symmetrically disposed with reference to a plane containing the axis 0, and the short circuited winding 17 is virtually disposed in the plane defined by the axes 0 and 18. The terminals $t1$ to $t7$ are tapped on an auto-transformer 12 which is energised by an alternating voltage of fixed amplitude applied between supply terminals 13 and 14. The taps on the auto-transformer 12 are arranged to provide equal voltage differences between terminals $t1$, $t2$, $t3$ etc. and the polarity of each of the exciting windings is so chosen that each of them produces a field which is in the same sense and is horizontal in the figure. Moreover, the location of the taps on the auto-transformer 12 is such that the voltage applied to each exciting winding is proportional to the number of stator pole-teeth embraced by the respective winding, the expression "teeth" being used to denote the part of the stator between adjacent slots. Therefore in operation of the transformer, the numbers of volts per turn of the primary windings are substantially proportional to the corresponding areas enclosed on the effective surface of the stator core 1. By this arrangement the desired magnetic flux distribution in the air gap between the stator and rotor is maintained with a high degree of accuracy.

The rotor core 2 has two full pitch secondary windings 15 and 16 whose magnetic axes are perpendicular to each other and to the axis 0, each secondary winding having 40 turns. The winding 15 has 10 of its turns in the slots 4a and 4b, 10 of its turns in the slots 4b and 4c and 20 of its turns in the slots 4c and 4d. Similarly the secondary winding 16 has 10 of its turns in the slots 4e and 4f, 10 of its turns in the slots 4f and 4g, and 20 of its turns in the slots 4g and 4h. The rotor has three slip rings and one end of both secondary windings is connected to one of these slip rings. The other end of one secondary winding is connected to a second slip ring and the other end of the other secondary winding is connected to the remaining slip ring. The slip rings are not illustrated since they may be of conventional construction.

In the arrangement illustrated, the rotor core 2 is shown oriented so that the secondary winding 15 is in the plane of the short-circuited winding 17 and in this position of the rotor, the voltage induced across the secondary winding 15 is substantially zero. When the rotor core 2 is rotated through an angle of approximately ±60° from this position, the voltage across the winding 15 is linearly related to the angular displacement with an accuracy of the order of 1 percent. Similarly when the rotor core 2 is so oriented that the secondary winding 16 is in the plane of the short-circuited winding 17 the voltage induced across the winding 16 is effectively zero and for an angular displacement of ±60° from this position, the voltage induced across the winding 16 is linearly related to the angular displacement. The two windings therefore give an output linearly proportional to displacement with overlapping ranges.

The ratio of a transformer may be expressed in terms of mutual inductance and primary inductance as $$\frac{E_s}{E_p} = \frac{M}{L_p}$$

where $E_s$ is the voltage induced across the secondary winding, $E_p$ is the voltage applied to the primary winding, $M$ is the mutual inductance of the windings and $L_p$ is the self inductance of the primary winding. Now $$M^2 = k^2 L_p L_s$$

where $k \leqslant 1$ and $L_s$ is the self inductance of the secondary winding.

In the transformer illustrated, $k$ is substantially constant and nearly equal to unity over a wide range of angular displacements of the rotor 2 from the null position. This is achieved by using a magnetic system in which the distribution of flux across the air gap does not depend upon such qualities as the width of the air gap or the homogeneity of the iron but is determined almost entirely by the conductors within the slots and the ratios of the voltages with which they are fed. The distribution of flux may or may not be in a relaxed state, that is to say in such a state that the removal of one or more of the primary windings has no effect on the flux distribution (apart from secondary effects due to the redistribution of the load among the remaining primary windings), but in any case a departure from the required uniform distribution results in heavy local currents which automatically oppose the departure. Since $k$ is constant and nearly equal to unity, the transformer provides a low output reactance, which is desirable, since the output reactance (denoted by $X_o$) is given by the relationship $$X_o = \omega L_s (1-k)$$

where $\omega$ is the angular frequency of the applied alternating current. The variation in $E_s$ is produced in the arrangement illustrated by varying $L_s$. Any attempt of the current in the secondary windings to change the flux in the stator core is strongly resisted, by virtue of the arrangement of primary windings and their energisation with fixed voltages from low impedance sources namely the taps on the auto-transformer 12.

The arrangement illustrated has further advantages inasmuch as the windings used on the stator make a positive contribution towards carrying a magnetising current as well as providing "fences" to maintain a desired flux distribution. This helps to minimise copper losses. Moreover, the windings are arranged to fill the slots without excessive bunching of the wires at the ends.

Modifications may, of course be made in the arrangement shown. Thus the number of turns in the winding and the number of slots and other similar factors may be varied. Moreover the primary windings may be mounted on the rotor core and the secondary windings mounted on the stator core.

What I claim is:

1. A variable linkage transformer comprising a hollow virtually cylindrical magnetisable core, a second virtually cylindrical magnetisable core mounted within and coaxial with said first core for relative angular displacement about a common axis, a series of windings wound on one of said cores said windings having a common axis perpendicular to the axis of said cores and enclosing a series of different areas on the effective surface of said one core, and at least one winding wound on the other of said cores, the axis of said last-mentioned winding being perpendicular to the common axis of said cores, said series of windings having individual terminals for the individual connection of said windings to external circuit means.

2. A transformer according to claim 1 wherein the windings of said series are arranged in pairs, the windings of each pair being symmetrically disposed about a plane containing the common axis of said cores.

3. A transformer according to claim 1 comprising a short-circuited winding on one of said cores which is virtually disposed in the plane defined by said common axis and the axis of said cores.

4. A variable linkage transformer comprising a hollow virtually cylindrical magnetisable core, a second virtually cylindrical magnetisable core mounted within and coaxial with said first core for relative angular displacement about the common axis, a series of windings wound on said first core having a common axis perpendicular to the axis of said cores and enclosing a series of different areas on the effective surface of said first core, two full pitch windings wound on said second core, the axes of said last-mentioned windings being perpendicular to one another and to the common axes of said cores, and the windings of said series having individual terminals for the individual connection of said winding to external circuit means.

5. A transformer arrangement for deriving a voltage representing angular displacement, comprising a hollow virtually cylindrical magnetisable core, a second virtually cylindrical magnetisable core mounted within and coaxial with said first core for relative angular displacement about the common axis, a series of primary windings on one of said cores having a common axis perpendicular to the axis of said cores and enclosing a series of different areas on the effective surface of one of said cores, at least one secondary winding wound on the other of said cores, the axis of said secondary winding being perpendicular to the axis of said cores, said series of primary windings being connected respectively to individual voltage sources supplying alternating voltages predetermined to maintain a desired magnetic flux distribution in the air gap between said cores substantially independently of the width of the air gap or the homogeneity of the cores, and means for deriving an output voltage from said secondary winding, said derived voltage being substantially linearly related to the relative angular displacement between said cores over a range of displacements.

6. An arrangement according to claim 5 comprising an auto-transformer having said primary windings connected across selected portions of said auto-transformer said auto-transformer portions constituting said individual voltage sources.

7. A transformer arrangement for deriving a voltage representing angular displacement, comprising a hollow virtually cylindrical magnetisable core, a second virtually cylindrical magnetisable core mounted within and coaxial with said first core for relative angular displacement about the common axis, a series of primary windings on one of said cores, the windings of said series having equal numbers of turns and having a common axis perpendicular to the axis of said cores and enclosing a series of different areas on the effective surface of one of said cores, at least one full pitch secondary winding wound on the other of said cores, the axis of said secondary windings being perpendicular to the axis of said cores, said series of primary windings being connected respectively to individual voltage sources supplying alternating voltages substantially proportional to the areas enclosed by the respective windings, and means for deriving an output voltage from said secondary windings, said derived voltage being substantially linearly related to the relative angular displacement between said cores over a range of displacements.

8. A transformer arrangement for deriving a voltage representing angular displacement, comprising a hollow virtually cylindrical magnetisable core formed on its inner surface with a plurality of uniformly spaced pole teeth parallel to the axis of the core, a second virtually cylindrical magnetisable core mounted within and co-axial with said first core for relative angular displacement about the common axis, a series of primary windings wound on said first core having equal numbers of turns and having a common axis perpendicular to the axis of said cores and enclosing a progressively increasing number of said pole teeth, two full pitch secondary windings wound on said other core, the axes of said secondary windings being perpendicular to each other and to the axis of said cores, an auto-transformer having said primary windings connected across portions of said auto-transformer predetermined to supply alternating voltages to the respective primary winding proportional to the numbers of pole teeth enclosed thereby, and means for deriving output voltages individually from said secondary winding said derived voltages being substantially linearly related to relative angular displacement between said cores over different and overlapping ranges of displacement.

References Cited in the file of this patent
UNITED STATES PATENTS

| | | |
|---|---|---|
| 1,672,703 | West | June 5, 1928 |
| 2,298,843 | Schiff | Oct. 13, 1942 |
| 2,466,690 | Curry | Apr. 12, 1949 |
| 2,608,682 | Herr | Aug. 26, 1952 |
| 2,660,681 | Horne | Nov. 24, 1953 |